Nov. 29, 1966   J. H. COWLES ETAL   3,288,542
METHOD OF ROLLING BEARING RACES
Filed Jan. 10, 1964   2 Sheets-Sheet 1
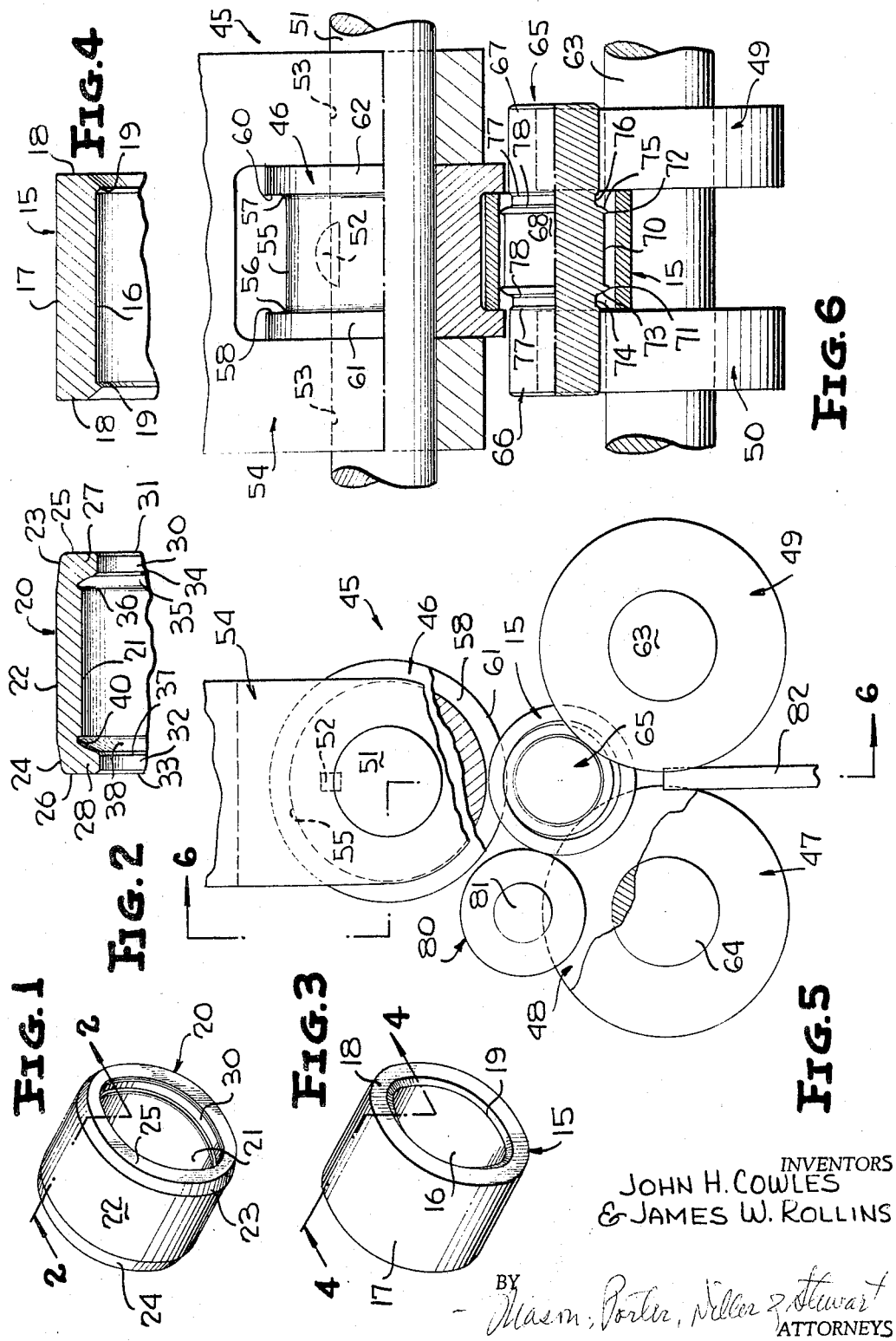
INVENTORS
JOHN H. COWLES
& JAMES W. ROLLINS
BY
ATTORNEYS Nov. 29, 1966    J. H. COWLES ETAL    3,288,542
METHOD OF ROLLING BEARING RACES
Filed Jan. 10, 1964    2 Sheets-Sheet 2
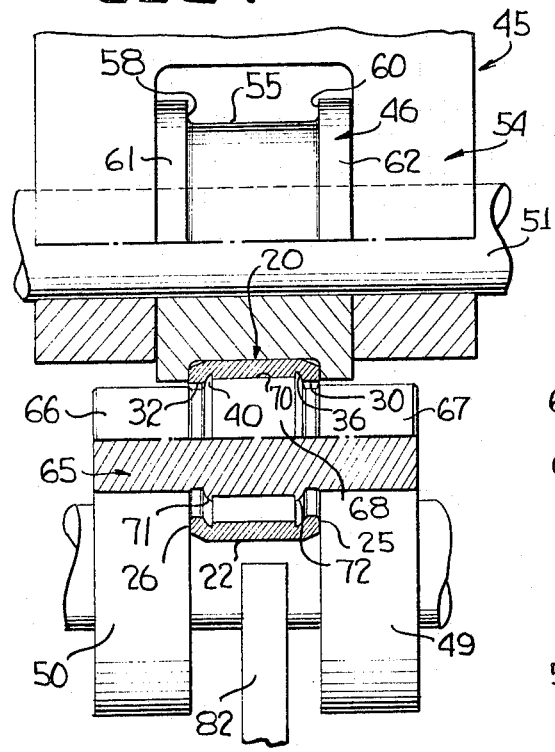
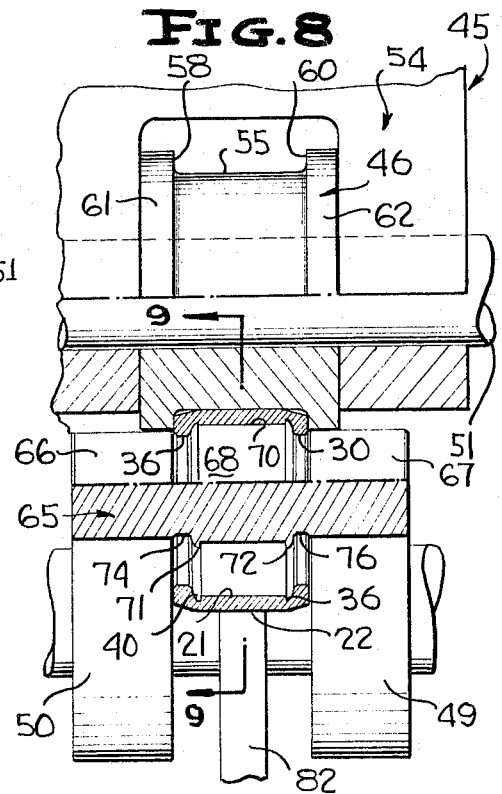
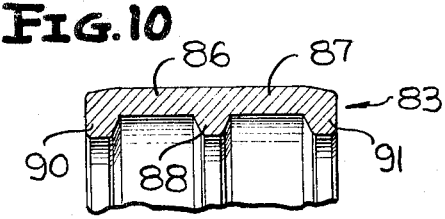
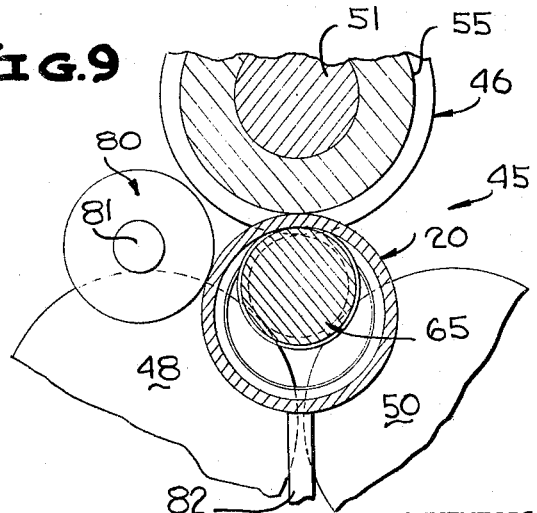
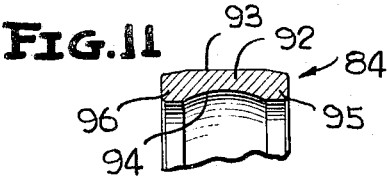
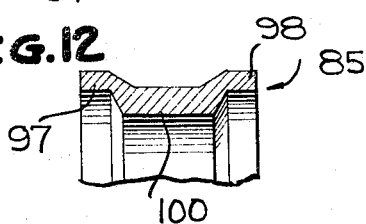
INVENTORS
JOHN H. COWLES
& JAMES W. ROLLINS
BY
ATTORNEYS

United States Patent Office 3,288,542
Patented Nov. 29, 1966

3,288,542
METHOD OF ROLLING BEARING RACES
John H. Cowles, Forestville, and James W. Rollins, Torrington, Conn., assignors to The Torrington Company, Torrington, Conn., a corporation of Maine
Filed Jan. 10, 1964, Ser. No. 337,017
9 Claims. (Cl. 308—216)

This invention relates to a novel method of forming multi-diameter annular rings from tubular blanks, and in particular, to a novel method of forming multi-diameter bearing races from tubular blanks of predetermined wall thickness by circumferentially elongating a portion of each of the tubular blanks thereby decreasing the initial wall thickness thereof and simultaneously confining remaining portions of the tubular blanks to at least retain the original wall thickness of the blanks at the remaining portions.

Heretofore it has been conventional to fabricate multi-diameter annular rings by many different methods which have been, for the most part, rather slow and uneconomical processes. For example, it is well known to manufacture multi-diameter annular rings from bar stock or relatively thick walled tubing by machining away excess material until the desired diameters are obtained. This method of forming multi-diameter annular rings is relatively expensive because considerable scrap material in the form of machining chips results, the machining is comparatively slow, and when multi-spindle production machines are employed, setup time and down time are high.

Another method for forming multi-diameter annular rings consists of rotating a tubular sleeve and turning in or turning out the ends of the sleeve without reducing the wall thickness of the sleeve or altering the initial main diameter thereof. Various factors, such as the type of material being turned, the size of the tubular sleeve, the shape of the ends, and tensile cracking in these ends, limit the use of this method.

Attempts have also been made to form multi-diameter annular rings by flowing metal of cylindrical sleeves laterally and radially inwardly to form rings having diameters differing from the original diameters of the sleeves. However, since metal exhibits very little lateral or axial flow when rolled in a circumferential direction, this method has been found to be commercially unfeasible.

It is also well known to form multi-diameter annular rings by shaping cylindrical sleeves without reducing the original wall thickness of the sleeves by casting a multi-diameter annular ring to the generally desired configuration and thereafter truing the ring by reducing or thinning the initial wall section and allowing all diameters of the cast ring to expand. Multi-diameter annular rings are also conventionally manufactured by shaping an annular ring which has been heated to forging temperature and thereby reducing the wall thickness and increasing the diameter. These latter two methods each have the inherent disadvantage of necessitating an additional step during the forming process of respectively casting a preshaped annular ring and heating the ring prior to the forming thereof.

The novel method of this invention utilizes the phenomena of the metal of a tubular sleeve to lengthen or elongate circumferentially or in the direction of rolling when the wall thickness of the sleeve is reduced or thinned, and the non-elongation if reduction of the wall thickness does not occur. Thus, when a selected portion of a cylindrical sleeve having an initial circumference is thinned by rolling, the selected portion will increase in circumference thereby increasing the diameter of the sleeve at the rolled portion. Those sections of the sleeve which are not circumferentially elongated remain substantially unaltered and are maintained at least at the initial thickness of the sleeve. Thus, the above-described phenomena permits the forming of multi-diameter annular rings from cylindrical sleeves by selectively thinning a circumferential wall portion to shape the annular ring to the desired configurations and if desired thereafter, size the rings by burnishing and metal-flow at the end of the forming operation.

It is therefore an object of this invention to form multi-diameter annular parts from cylindrical sleeves by cold-rolling or cold working selective circumferential portions of cylindrical sleeves in a manner heretofore unprovided for in the prior art to thereby eliminate the inherent disadvantages in the above-noted prior art methods.

Another object of this invention is to provide a novel method of forming multi-diameter annular rings from tubular blanks by reducing the wall thickness of a selected circumferential portion of a blank by cold-rolling or cold working only the selected portion of the blank between internal and external rolls thereby increasing the circumferential dimension of the selected circumferential portion, and confining at least another circumferential portion between the internal and external rolls to at least maintain the original wall thickness of this latter circumferential portion.

Still another object of this invention is to provide a novel method including each of the steps immediately above-described, and in addition, assuring true roundness or circularity of the annular rings during the cold-rolling thereof by urging a further external roll against an exterior circumferential surface of the tubular blanks.

A further object of this invention is to provide a novel method of forming multi-diameter annular rings from metallic sleeves by selectively reducing the wall thickness of a first portion of the metallic sleeve by cold-rolling the sleeve between internal and external rolls thereby increasing the circumferential dimension and diameter of the first portion, confining at least another circumferential portion of the metallic sleeve between the internal and external rolls to at least retain the original wall thickness of this latter circumferential portion, maintaining true roundness of the sleeve during the cold-rolling thereof by urging a further external roll against an external circumferential surface of the sleeve, and final-sizing at least this latter circumferential portion by cold flowing the metal of the latter circumferential portion.

Still another object of this invention is to provide a novel multi-diameter bearing race comprising a cylindrical tubular body of a substantially initially uniform wall thickness and inside diameter, the body including a circumferentially elongated portion, the circumferentially elongated portion having a greater inside diameter and reduced wall thickness as compared to the initial diameter and thickness of the tubular body, at least one radially inwardly directed annular portion immediately adjacent the circumferentially elongated portion, and the annular portion having a wall thickness equal to at least the initial wall thickness of the body.

Still another object of this invention is to provide a novel bearing race of the type immediately above-described wherein the cylindrical tubular body includes at least a second radially inwardly directed annular portion immediately adjacent the circumferentially elongated portion, and the annular portions are arranged on opposite sides of the circumferentially elongated portion and each has a wall thickness equal to at least the initial wall thickness of the tubular body.

Another object of this invention is to provide a novel method of forming a multi-diameter bearing race comprising the steps of forming a metallic sleeve by working metal longitudinally, and thereafter circumferentially rolling the sleeve to decrease the wall thickness of the sleeve to obtain uniform grain structure and increased isotropic properties at the circumferentially rolled portion of the sleeve.

With the above and other objects in view that will hereinafter appear, the nature of the invention will be more clearly understood by reference to the following detailed description, the appended claims and the several views illustrated in the accompanying drawings:

In the drawings:

FIGURE 1 is an end perspective view of a multi-diameter bearing race formed in accordance with the method of this invention.

FIGURE 2 is an enlarged fragmentary sectional view taken along line 2—2 of FIGURE 1, and illustrates a thinned wall section of a central circumferential portion of the bearing race and an annular unthinned portion at each edge of the bearing race.

FIGURE 3 is an end perspective view of a cylindrical, metallic sleeve from which the multi-diameter bearing race of FIGURES 1 and 2 is formed and generally illustrates the uniform wall thickness of the cylindrical sleeve prior to a forming operation.

FIGURE 4 is a fragmentary enlarged sectional view taken along line 4—4 of FIGURE 3, and more clearly illustrates the uniform wall thickness of a cylindrical sleeve prior to being formed into the multi-diameter bearing race of FIGURES 1 and 2.

FIGURE 5 is a fragmentary side elevational view with portions thereof broken away for clarity, and illustrates an internal roll, a working external roll, a plurality of external support rolls, a sizing probe, and a cylindrical sleeve supported by the internal roll prior to the initiation of the rolling operation.

FIGURE 6 is a fragmentary sectional view taken along line 6—6 of FIGURE 5, and more clearly illustrates the relative position of the rolls and cylindrical sleeve prior to the formation thereof into a multi-diameter bearing race.

FIGURE 7 is a sectional view taken substantially along a line identical to the line 6—6 of FIGURE 5, but illustrates the cylindrical sleeve after a central circumferential portion thereof has been thinned.

FIGURE 8 is a fragmentary sectional view taken substantially along the line 6—6 of FIGURE 5, but illustrates the position of the rolls and the cross-sectional configuration of the multi-diameter bearing race at the termination of the rolling operation.

FIGURE 9 is an enlarged fragmentary sectional view taken along line 9—9 of FIGURE 8, and more clearly illustrates the relative positions of the internal and external rolls, the sizing probe and the completely formed multi-diameter bearing race at the completion of the forming operation.

FIGURES 10 through 12 are fragmentary axial sectional views of three multi-diameter bearing races formed in accordance with the novel method of this invention, and illustrates different conformations of multi-diameter parts readily obtained by the novel method of this invention.

This invention will be best understood by first describing a cylindrical sleeve 15 shown in FIGURES 3 and 4 from which is formed a multi-diameter annular ring or bearing race 20 of FIGURES 1 and 2.

The cylindrical sleeve or cylindrical tubular blank 15 is preferably made of metal, and the metal is preferably initially worked longitudinally by draw-forming the sleeve. The cylindrical sleeve 15 includes an inner circumferential surface 16, an external circumferential surface 17, and identical opposite peripheral edges 18, 18 (FIGURE 4). The internal diameter, and wall thickness (defined by the area between the circumferential surfaces 16 and 17) of the cylindrical sleeve 15 are initially uniformly dimensioned. That is, the internal and external diameters and the wall thickness of the cylindrical sleeve 15 are substantially constant throughout the axial length of the sleeve between the peripheral edges 18, 18.

Prior to selectively cold rolling one or more portions of the sleeve 15 in a manner to be described hereafter, inside peripheral corners of the sleeve at the juncture of the inner surface 16 and the peripheral edges 18, 18 are struck or pressed inwardly to form identical radially inwardly directed ridges 19, 19.

The cylindrical sleeve 15 is formed to the general axial sectional configuration of the bearing race 20 illustrated in FIGURES 1 and 2 of the drawings. The general configuration of the bearing race 20 of FIGURES 1 and 2 is merely exemplary for purposes of describing this invention, and it is to be understood that bearing races of diverse contours can be formed by practicing this invention, as will be more clearly described hereafter.

The bearing race 20 comprises a central, circumferential, interior race surface 21 and a central circumferential exterior surface 22. The thickness of the wall of the bearing race 20 between the central circumferential surfaces 21 and 22 is substantially thinner than the thickness of the wall between the circumferential surfaces 16 and 17 of the cylindrical sleeve 15, as is readily apparent by a comparison of FIGURES 2 and 4 of the drawings. The diameters of the central, circumferential surfaces 21 and 22 of the bearing race 20 are also substantially increased as compared to the respective diameters of the circumferential surfaces 16 and 17 of the cylindrical sleeve 15. Circumferential end surface portions 23 and 24 of the exterior, central, circumferential surface 22 each curve gradually toward the axis of the bearing race 20 and terminate at respective peripheral edges 25 and 26. The peripheral edges 25 and 26 each partially define a respective identical radially inwardly directed annular projection 27 and 28.

The annular projection 27 terminates in an inward circumferential edge 30 blended to the peripheral edge 25 by an outermost circumferential chamfer 31. The annular projection 28 similarly terminates at an inner circumferential edge 32 blended to the peripheral edge 26 of the bearing race 20 by an outermost circumferential chamfer 33. Circumferential edges 30 and 32 of the respective annular projections 27 and 28 are slightly greater than the diameter of the interior circumferential surface 16 of the cylindrical sleeve 15, as is readily apparent by comparing FIGURES 2 and 4 of the drawings. It should also be particularly noted that the wall thickness or radial dimension of each of the annular projections 27 and 28 is preferably maintained at least equal to or greater than the original wall thickness of the cylindrical sleeve 15. That is, the radial distance between the inner circumferential edges 30 and 32 and the exterior circumferential surface 22 of the bearing race 20 is preferably substantially equal to the original radial distance between the circumferential surfaces 16 and 17 of the cylindrical sleeve 15.

The inner circumferential edge 30 of the annular projection 27 is circumferentially chamfered at 34. The chamfer 34 blends into an internal, sloping, peripheral surface 35 terminating in a shallow circumferential groove 36 at the circumferential race surface 21 of the bearing race 20. The inner circumferential edge 32 of the annular projection 28 is similarly circumferentially chamfered at 37 and blends into an internal, gradually sloping, peripheral surface 38 which terminates in a shallow circumferential groove 40 at the circumferential race surface 21.

Other than the similarity between the radial dimension of the annular projections 27 and 28 and the wall thickness of the cylindrical sleeve 15 between the surface 16, 17 it is important to note that the axial or longitudinal length of the cylindrical sleeve 15 is substantially identical to the longitudinal or axial length of the formed bearing race 20.

An apparatus or mechanism for forming an multi-diameter annular ring, such as the bearing race 20 of FIGURE 2, from a substantially cylindrical sleeve, such as the cylindrical sleeve 15 of FIGURE 4 is best illustrated in FIGURES 5 and 6 of the drawings and is generally designated by the reference numeral 45. The apparatus 45 comprises a housing (not shown) in which is rotatably mounted a plurality of external rolls or rollers 46 through 50. The external rolls 46 through 50 are rotated in unison in a known manner through a conventional gearing mechanism forming no part of this invention, and a description thereof is deemed unnecessary for a complete understanding of this invention.

The external roll 46 of the apparatus 45 is a working or forming roll and is secured to a shaft 51 in a conventional manner, as for example, by a key 52. The shaft 51 is rotatably journalled between a pair of identical, axially aligned bores 53 of a bifurcated member 54. The bifurcated member 54 is reciprocated by a conventional mechanism (not shown) for movement toward and away from the external rollers or rolls 47 through 50.

The external roll 46 includes a central, circumferential working surface 55 terminating at identical, circumferential blend radiuses 56 and 57. The blend radiuses 56 and 57 terminate at opposed surfaces 58 and 60 of a pair of end flanges 61 and 62 of the external roll 46.

The external rolls 49 and 50 (see FIGURE 6) are secured in axial spaced relationship to a common shaft 63 while the external rolls 47 and 48 are similarly secured in spaced relationship to a common shaft 64. The four rolls 47 through 50 support a single internal roll or arbor 65.

The internal roll 65 comprises oppositely directed, cylindrical end portions 66 and 67 supported respectively by the external rolls 48, 50 and 47, 49. A central working portion 68 of the internal roll 65 between the end portions 66 and 67 has a central, circumferential working surface 70 opposing the circumferential, central working surface 55 of the external roll 46. The circumferential working surface 70 of the internal roll 65 terminates at pair of circumferential beads 71, 72, each having a diameter slightly greater than the diameter of the central working surface 70. A peripheral end face 73 blends the circumferential bead 71 with a recess or channel 74 while a substantially identical end face 75 similarly blend the circumferential bead 72 with a recess or channel 76. The channels 74 and 76 are identically circumferentially chamfered at 77 and 78.

A substantially smaller external roll 80 (FIGURE 5) is positioned between the external rolls 47 and 48 and is rotatably journal in the housing (not shown) by a shaft 81. A suitable mechanism (also not shown) reciprocates the shaft 81 and the external roll 80 secured thereto toward and away from the internal roll or arbor 65 to maintain the true roundness or circularity of a blank being formed by the apparatus 45 between the external work roll 46 and the internal roll or arbor 65.

The novel forming operation performed by the apparatus 45 is initiated by first striking or pressing the peripheral ridges 19, 19 at opposite end portions of the metallic sleeve 15. The material of the ridges 19, 19 insures proper filling of the lips 27, 28 at the termination of the cold-rolling operation.

The sleeve 15 is then positioned between the central, circumferential working surfaces 55 and 70 of the respective external and internal rolls 46 and 65. This is accomplished by reciprocating the bifurcated member 54 in a conventional manner away from the external rolls 47 through 50, inserting the cylindrical sleeve 15 upon the central working portion 68 of the internal roll 65, and thereafter reciprocating the bifurcated member 54 to the position illustrated in FIGURE 6 of the drawings. In this position, no forming of the cylindrical sleeve 15 has occurred and the sleeve 15 is merely fitted within the area between the opposing surfaces 58 and 60 of the external roll 46. The longitudinal or axial distance between these faces 58 and 60 is substantially identical to the axial or longitudinal distance between the peripheral edges 25 and 26 of the formed bearing race 20 of FIGURES 1 and 2, while the longitudinal or axial distance between the circumferential faces 73 and 75 of the internal roll 65 is substantially equal to the longitudinal or axial distance between the internal opposed surfaces 35 and 38 of the bearing race 20.

As the external rolls 46 through 50 are rotated through the conventional gearing mechanism heretofore mentioned, and the bifurcated member 54 is reciprocated from the position illustrated in FIGURE 6 toward the position illustrated in FIGURE 7, the advancement of the external roll 46 establishes contact between the central, circumferential working surface 55 of the external roll 46 and the exterior circumferential surface 17 of the cylindrical sleeve 15. When contact is thus established, the forming pressure exerted by the circumferential working surface 55 of the external roll 46 begins at the maximum diameters of the beads or shoulders 71, 72 of the internal roll 65 until the relatively shallow channels 40 and 36 of the bearing race 20 are formed, as is clearly illustrated in FIGURE 7. Continued pressure between the rolls 46 and 65 caused by the advancement of the bifurcated member 54 begins to thin the cylindrical sleeve 15 only at a center circumferential portion between the grooves 36 and 40 by the action of the central, circumferential working surfaces 55 and 70 of the respective rolls 46 and 65.

At this point in the formation of the cylindrical sleeve 15 into the bearing race 20, the sleeve 15 has been formed to the configuration shown in FIGURE 7. Up to this point of the cold forming operation, only the central circumferential portion of the sleeve 15 between the grooves 36 and 40 has been thinned by the cold working of the metal, and in this circumferential central portion both the inside and outside diameters of the sleeve 15 have been increased. The peripheral edge portions of the blank 15 (or the lips 27, 28 of the sleeve) between the flanges 61 and 62 of the external roll 46 and the respective shoulders 71 and 72 of the internal roll 65 have merely been therebetween axially confined, and relatively no cold working or thinning of these edge portions has occurred except what slight working might occur by the transfer of internal stresses in the blank from the central circumferential cold worked portion. Such transfer of stresses is maintained at a minimum by the beads 71 and 72 of the roll 65 which confine an internal cylindrical volume of the metal of the central portion therebetween. Thus, though the external and internal diameters of the circumferential central portion of the sleeve 20 are increasing and the wall therebetween is thinning, the external and internal diameter of the sleeve 20 at the peripheral portions 30, 32 increases only slightly beyond the original internal diameter of the surface 16 of the blank 15.

During the formation of the bearing race 20 from the cylindrical sleeve 15 to the point thus far described, the smaller roll 80 is progressively urged against the exterior circumferential surface 17 of the cylindrical sleeve 15 as the same is decreased in diameter to maintain or assure the true roundness or circularity of this sleeve. This movement can be imparted to the roll 80 in various ways as for example, by a hydraulically operated piston responsive to a test probe in continual contact with the exterior surface of the sleeve. As the sleeve increases in circumference, hydraulic fluid is emitted into a chamber to urge the piston carrying the roll 80 outwardly into continual contact with the sleeve.

This thinning and the attended diameter increase of the circumferential central portion of the cylindrical sleeve 15 continues until the difference between the diameter of the shallow grooves 36, 40 of the bearing race 20 and the diameter of the inner circumferential edges 30, 32 of the annular projections 27 and 28 is substantially equal to the difference between the diameter of the channels 74, 76 and the central circumferential working surface 70 of the internal roll 65, as is shown in FIGURE 8 of the drawings. With the continued approach of the external roll 46 toward the position illustrated in FIGURE 8 the circumferential central portion of the bearing race 20 between the grooves 36 and 40 is gradually completely cold worked until the internal and external surfaces 21 and 22 respectively are at predetermined diameters. The lips 27 and 28 which have not been subjected to the cold working operation and have been merely axially confined between the beads 71, 72 and the flanges 61, 62 are thereby maintained at substantially the thickness of the blank 15, except for a slight increase attributed to the internal stress as has been heretofore noted. As the rolls 46 reach the position shown in FIGURE 8, all critical portions of the bearing race 20 contact the roll 65 for adjustment of size and shape occurring by burnishing and mild metal flow. This final burnishing is necessary for critical dimensional elements, such as bearing races, but may be eliminated where such criticality is unnecessary.

Upon final sizing of the bearing race 20 the exterior central circumferential surface 22 of the race 20 contacts a conventional sizing probe 82 positioned beneath the internal roll 65 coplanar to a plane through the axes of the rolls 46 and 65 (FIGURES 5 and 9). The sizing probe 82 is of a conventional construction and operates to relay a signal which terminates the advancement of the bifurcated member 53 toward the rolls 47 through 50 and initiates the return of the bifurcated member 54 to the original position thereof prior to the initiation of the forming operation.

As was heretofore noted, the bearing race 20 merely exemplifies one of many different cross-sectional configurations which may be formed by the apparatus of FIGURES 1 through 9 of the drawings and the described method. Three of such differentially contoured multi-diameter bearing races or annular rings formed by the method above-described are shown in FIGURES 10 through 12 of the drawings and are generally designated by the respective reference numerals 83 through 85. Each of the bearing races 83 through 85 are formed by selectively cold working a cylindrical blank or sleeve (not shown) substantially identical to the sleeve 15 of FIGURE 4.

The bearing race 83 is similar to the bearing race 20 of FIGURES 1 and 2, and includes two circumferential wall portions 86 and 87, a central, radially inwardly projecting annular projection 88, and two inwardly directed annular projections 90 and 91 at opposite ends of the bearing race 83. The wall thickness of the circumferential wall portions 86 and 87 is thinned as compared to the original wall thickness of a cylindrical sleeve (not shown) from which the bearing race is formed. The original wall thickness of this sleeve is substantially equal to the radial distance or thickness of the annular projections 88, 90 and 91, and the axial length of the sleeve and the race 83 are substantially identical. Thus, the bearing race 93 has inner and outer circumferential surfaces (unnumbered) defining the circumferential wall portions 86 and 87 which are of a greater diameter than the initial diameter of the cylindrical sleeve from which the race is cold worked. The circumferential wall portions 86 and 87 are also appreciably thinned due to the cold working thereof while the substantially unworked, axially confined annular projections 88, 90 and 91 are at least equal to or slightly greater in thickness than the wall thickness of the cylindrical sleeve.

The multi-diameter bearing race 84 of FIGURE 11 includes a thinned and circumferentially elongated central wall portion 92 defined between an exterior circumferential surface 93 and a generally arcuate interior circumferential surface 94. One of a pair of radially, inwardly directed annular projections 95, 96 is formed at each of the axial extremities or peripheral edges of the bearing race 84. As compared to the cylindrical sleeve from which the bearing race 84 is formed, the bearing race 84 is circumferentially thinned in the circumferential, central portion 92 and both the circumference and the inner and outer diameters thereof have been increased. The internal diameter of the annular projections 95 and 96 is slightly larger than the internal diameter of the cylindrical sleeve, and the radial dimension or wall thickness of these annular projections is maintained at least equal to the original wall thickness of the sleeve.

The multi-diameter bearing race 85 of FIGURE 12 differs from the bearing races 20, 83 and 84 only in the fact that axial extremities 97 and 98 of the bearing race 85 are circumferentially elongated as compared to the cylindrical sleeve (not shown) from which the bearing race 85 is formed while a central, circumferential portion 100 of the bearing race remains unaltered. The radially thinned and circumferentially elongated extremities 97 and 98 of the bearing race 85, thus, each have a circumference, internal diameter and external diameter greater than these respective dimensions of the original cylindrical sleeve from which the bearing race 85 is formed. The circumferential central portion 100 remains substantially unchanged compared to the original cylindrical sleeve and constitutes a radially inwardly directed annular projection similar to the annular projections 88 of the bearing race 83 of FIGURE 10. That is, both the annular projections 88 and 100 of the respective bearing races 83 and 85 are located between the axial extremities of these bearing races, as distinguished from, for example, the annular projections 90 and 91 at the extremities of the bearing race 83, and the radial dimension or wall thickness of the projection 100 is substantially the same as or slightly greater than the initial wall thickness of the sleeve from which the race 85 is formed.

From the foregoing, it will be seen that novel and advantageous provision has been made for forming multi-diameter annular rings from cylindrical sleeves by the novel selective reduction in wall thickness of a circumferential portion of the sleeve whereby circumferential and diametric expansion takes place. The described method, apparatus and the article produced thereby may be varied somewhat, but such variations in the example disclosures are considered within the spirit and scope of this invention as defined in the appended claims.

We claim:

1. A bearing race comprising a cylindrical tubular body of a substantially uniform initial wall thickness and inside and outside diameters, said body including a circumferentially elongated portion, said circumferentially elongated portion having a greater inside and outside diameter and reduced wall thickness in comparison to the initial diameter and thickness of the body, and at least one radially inwardly directed non-circumferentially elongated annular portion immediately adjacent the circumferentially elongated portion, said annular portion having a wall thickness and inner diameter at least substantially equal to the initial wall thickness and inner diameter of the body.

2. A bearing race comprising a cylindrical tubular body of a substantially uniform initial wall thickness and inside and outside diameters, said body including a circumferential central portion, said central portion including an exterior cold-worked circumferentially elongated surface, said circumferentially elongated surface having a greater inside diameter in comparison to the initial diameter of the body, and at least one radially inwardly directed annular non-cold worked portion immediately adjacent the circumferentially elongated portion, said annular portion having a wall thickness and inner diameter at least substantially equal to the initial wall thickness and inner diameter of the body.

3. A bearing race comprising a cylindrical tubular body of a substantially uniform initial wall thickness and inside and outside diameters, said body including circumferentially elongated and cold-worked radially inner and outer surface portions, said circumferentially elongated portions having a greater inside diameter and reduced wall thickness in comparison to the initial diameter and thickness of the body and at least one radially inwardly directed annular portion immediately adjacent the circumferentially elongated portion at each axial side thereof, said annular portions each having a wall thickness and inside diameter at least substantially equal to the initial wall thickness and inside diameter of the body.

4. The bearing race as defined in claim 3 wherein the annular portions are at axial extremities of the tubular body.

5. The bearing race as defined in claim 3 wherein one of the two annular portions is between axial extremities of the tubular body and a second of the annular portions is at an axial extremity of the tubular body.

6. A bearing race comprising a generally cylindrical metallic tubular body, said body including a central circumferential portion and at least one radially inwardly directed annular portion immediately adjacent the central portion at each axial side thereof, the metal at both inner and outer surfaces of said central portion being cold-worked and circumferentially elongated, and the metal at the inner and outer surfaces of both of said annular portions being generally non-cold-worked and circumferentially non-elongated.

7. The bearing race as defined in claim 6 wherein said inner and outer surfaces of said central portion are right cylindrical parallel surfaces.

8. The bearing race as defined in claim 6 wherein a radially inwardly opening circumferential groove is disposed between the central circumferential portion and each of said annular portions.

9. The bearing race as defined in claim 7 wherein a radially inwardly opening circumferential groove is disposed between the central circumferential portion and each of said annular portions.

References Cited by the Examiner
UNITED STATES PATENTS

| | | | |
|---|---|---|---|
| 2,783,528 | 5/1957 | Menne | 29—148.4 |
| 2,792,619 | 5/1957 | Komm | 29—148.4 |
| 3,036,365 | 5/1962 | Hanau | 29—148.4 |

DAVID J. WILLIAMOWSKY, *Primary Examiner.*

FRANK SUSKO, *Examiner.*